Patented June 21, 1938

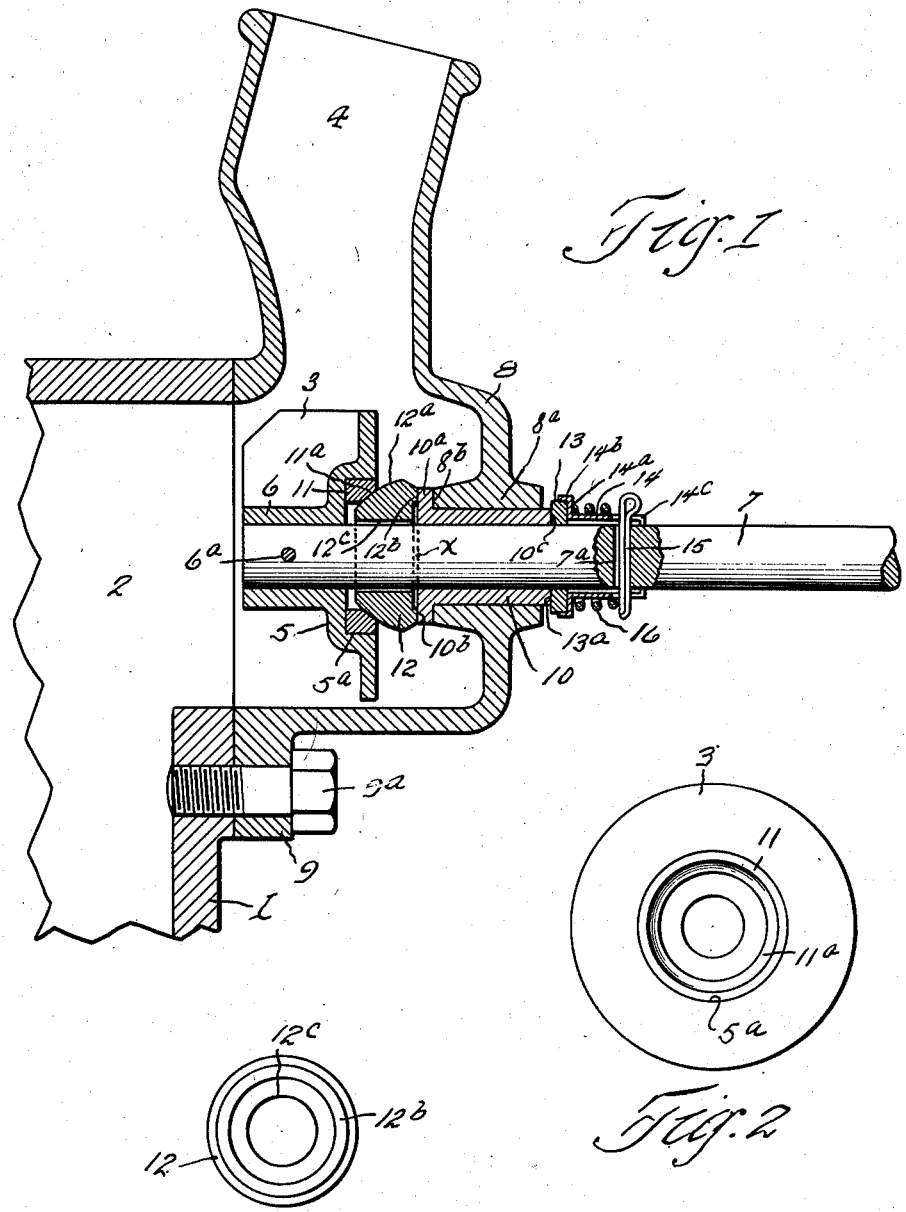

2,121,299

UNITED STATES PATENT OFFICE 2,121,299

SEALING MEANS

Frederick W. Peters, Cleveland, Ohio

Application October 18, 1935, Serial No. 45,634

7 Claims. (Cl. 286—7)

This invention relates to means for sealing against leakage the shafts of pumps or similar device employed for the circulation of liquid. As shown herein, my invention is particularly useful in connection with the water-circulating systems of automobiles, although not limited to use in that particular field of industry. The general purpose and object of my invention is to provide, for shaft-operated pumps, impellers, and the like, a sealing means which is capable of operating efficiently for a long period of time, which is extremely simple in construction, which consists of a minimum number of parts, which is cheap of production, and which will compensate automatically for slight misalignments of the shaft and/or its bearings as well as for any wear of the sealing means.

I accomplish the foregoing objects in and through the construction and arrangement of parts shown in the drawing herein, wherein Fig. 1 represents a sectional elevation of a pump of the impeller type provided with the sealing means of my invention, the same being shown as applied to the water-circulating system of an automobile; Fig. 2 is a view in elevation of the impeller shown in Fig. 1, showing a sealing ring in place therein; and Fig. 3 is an elevation of the outboard end of the spherical packing ring shown in Fig. 1.

Describing the parts by reference characters, 1 denotes the upper portion of the front wall of a liquid-containing chamber 2 within which an impeller 3 operates. The chamber 2 may be provided within the cylinder block of an engine and constitute part of the water-circulation system thereof. This chamber is provided with an outlet connection 4 through which water is moved by the rotation of the impeller.

The impeller is shown as formed on a housing 5 having at its inboard end a sleeve 6, which may be secured to the shaft 7 by a driving fit, or by a pin 6ª, the said shaft being provided with any approved driving means (not shown).

The impeller is conveniently assembled in a unit including the housing 8 of which the outlet connection 4 may constitute a part, said housing surrounding the impeller and the inboard end of the shaft 7 and being provided with a flange 9 whereby it may be bolted or otherwise conveniently secured to the adjacent wall 1 of the chamber 2, as indicated at 9ª. The housing 8 is provided with a sleeve 8ª the cylindrical bore of which is provided with a bushing 10 pressed tightly thereinto and forming a bearing for the shaft 7. This bushing is provided at its inboard end with a radially outwardly extending flange 10ª, the outboard annular face of which abuts against the corresponding annular face 8ᵇ on the inboard end of the sleeve 8ª. It will be noted that the outboard end of the bushing projects beyond the outboard end of the sleeve 8ª.

The impeller housing 5 is provided with a cylindrical seat 5ª within which there is pressed a sealing ring 11 having a spherical seating surface 11ª at the outboard end thereof and extending outwardly from the inner cylindrical wall thereof. 12 denotes a sealing ring which is approximately hemispherical in shape, the inner end of the radius of its spherical surface 12ª coinciding preferably with the point X on the axis of the shaft 7, as does also the inner end of the radius of the seating surface 11ª on the ring 11. The ring 12 may be of any wear-resistant material, but I have found that a species of hard carbon, known to the trade as "Morganite" carbon, is well adapted for the construction of such rings. However, it may be made of steel, chromium-plated for hardness if desired.

The ring 12 is provided on its outboard end with an annular bearing surface 12ᵇ which is adapted to engage the cooperating surface 10ᵇ on the flange 10ª, the said flange constituting a sealing member. It will be noted that the annular bearing surface 12ᵇ is in contact with the surface 10ᵇ throughout its entire extent whereby no portion of the former surface will overhang the periphery of the latter surface. This is particularly important where the sealing ring 12 is made of carbon or a carbon composition of the character referred to hereinbefore. Should the bearing surface 12ᵇ project beyond the periphery of the cooperating surface 10ᵇ, a groove will be cut in the former surface, with an overhanging annular ledge at the periphery thereof, making it practically impossible to maintain a seal between the said surfaces.

13 denotes a ring which is rotatable with the shaft 7, as by having a driving fit thereon, the inboard face 13ª of said ring engaging the outboard end 10ᶜ of the bushing 10. Surrounding the shaft is a sleeve 14 having at its inboard end a seat comprising the annular wall 14ª and the cylindrical wall 14ᵇ, which walls are adapted to engage respectively the outboard annular wall and the outer cylindrical wall of the ring 13. The outboard end of the sleeve 14 is provided with diametrically opposed slots 14ᶜ through which and a slot 7ª in the shaft 7, a cotter pin 15 extends.

Surrounding the sleeve 14 and interposed between the pin 15 and the wall 14ᵃ, is a helical spring 16 which tends to move the shaft 7 and the impeller 3, together with the ring 11, in an outboard direction and thus to maintain the sealing surfaces 11ᵃ, 12ᵃ, 12ᵇ, 10ᵇ, 10ᶜ and 13ᵃ in sealing engagement. It will be noted that the slot 7ᵃ is elongated in the direction of the length of the shaft thereby to accommodate sufficient movement of the shaft in an outboard direction to compensate for the wear of the parts.

The rings 11 and 13 may be of any desirable bearing material, such as steel, phosphor bronze, spring brass, or spring steel chromium plated for hardness, while the bushing 10 is preferably of bronze; the ring 11 may also be of deformable resilient material.

The ring 12 is provided with a bore 12ᶜ of greater diameter than the diameter of the shaft 7, whereby it may have a floating movement with reference to said shaft sufficient to automatically adjust itself and compensate for wear and for any slight misalignment between the shaft 7 and its bearings, as well as to cooperate efficiently with the surface 11ᵃ of the ring 11 and the inboard annular face 10ᵇ of the flange 10ᵃ.

With the parts constructed and arranged as described, it is believed that the operation will be readily understood. When the shaft 7 is rotated, the bearing ring 11 is rotated thereby, being mounted in the seat provided therefor in the hub 5 of the impeller. The spherical surface 11ᵃ of said ring rotates in engagement with the adjacent spherical surface of the ring 12, thereby tending to impart rotary movement to the latter ring. The annular bearing surface 12ᵇ of the latter ring engages and is maintained in close contact with the inboard annular surface of the flange 10ᵃ by the action of the spring 14, which spring also presses the sealing ring 13 against the outboard end of the bushing 10.

If desired, the ring 13 may be formed as part of the inboard end of the sleeve 14, instead of being made separately therefrom, as shown.

By the construction shown and described, an effective seal is provided between the rings 11 and 12, between the ring 12 and the flange on the bushing 10, and between the ring 13 and the outboard end of said bushing. Furthermore the parts are maintained in said sealing relation by the action of the spring 16; and the spring, not constituting a part of the driving means but operating only to hold the various sealing parts in engagement, does not become crystallized in use and hence will last for an indefinitely long time.

The construction shown and described herein is simple, comprising but few parts; it is economical of production; and will operate efficiently for a long period of time for the purpose for which it is designed.

The ring 12 may either be disconnected from the shaft 7, or may have a driving connection therewith, as by the pin-and-slot arrangement shown in my copending application No. 43,884, filed October 7, 1935.

Having thus described my invention, what I claim is:

1. The combination, with a rotatable shaft and a mounting for said shaft and within which said shaft is adapted to rotate, of a packing structure therefor comprising a sealing ring surrounding said shaft and having adjacent to one end a spherical surface directed toward said shaft and at its opposite end an annular bearing surface, a member surrounding the said shaft and attached thereto and having an annular seat surrounding and spaced from said shaft, an annular sealing ring within said seat and having a spherical sealing portion extending around an inner edge thereof and adapted to engage the corresponding spherical portion of the first-mentioned ring, the annular bearing surface at the opposite end of the first mentioned ring being radially spaced from the shaft, a cooperating bearing member surrounding the shaft and adapted to be engaged at one end by said annular bearing surface, a helical spring surrounding the shaft, a member driven by said shaft and engaged by one end of said spring, and a sealing ring engaging the opposite end of said bearing member and pressed into engagement therewith by said spring.

2. In the combination recited in claim 1, the member driven by the shaft and engaged by said spring comprising a pin mounted in a slot extending through said shaft whereby the spring may press the shaft bodily lengthwise thereof to compensate for wear in the sealing members.

3. The combination, with a rotatable shaft and a member secured to the inboard end of said shaft and having an annular seat spaced from the shaft, of a sealing ring mounted within said seat and having a spherical surface extending around an inner edge thereof, a sealing ring loosely surrounding said shaft and having adjacent to one end thereof a spherical surface cooperating with the spherical surface of the first mentioned ring and having at its opposite end a plane annular surface surrounding and spaced radially from the shaft, a member surrounding the shaft within which said shaft is adapted to rotate and having an annular surface cooperating with and engaged by the entire annular surface of the second ring, and a spring serving to press the said surfaces into engagement with one another.

4. The combination with a rotatable shaft and a member secured to the inboard end of said shaft and having an annular seat spaced from the shaft, a sealing ring mounted within said seat and having a spherical surface extending around an inner edge thereof, a sealing ring surrounding said shaft and having adjacent to one end thereof a spherical surface cooperating with the spherical surface of the first mentioned ring and having at its opposite end an annular surface surrounding and spaced from the shaft, a member surrounding the shaft within which said shaft is adapted to rotate and having an annular surface cooperating with the annular surface of the second ring, a sleeve surrounding the shaft and carrying at one end means adapted to engage the end of the last mentioned member which is opposite to the annular bearing surface thereof, the sleeve being provided with diametrically opposed longitudinally extending slots and the shaft having a slot extending longitudinally therethrough, a pin extending through the said slots, and a spring mounted on the sleeve and having one end engaging said pin and the opposite end pressing against the means carried by said sleeve.

5. The combination, with a rotatable shaft and a bushing through which the shaft extends and having a radially outwardly extending flange at its inboard end provided on its inboard face with an annular bearing surface, a member secured to the inboard end of said shaft and having an annular seat surrounding the shaft, a sealing ring within said seat and having a spherical surface extending around an inner edge thereof, a second sealing ring interposed between the first sealing ring and the bearing surface on said flange, the second sealing ring having adjacent to one end a spherical surface directed toward said shaft and at its opposite end an annular bearing surface adapted to engage the bearing surface on said flange, a sleeve surrounding the shaft and having at its inboard end a radially outwardly extending member and having opposed longitudinally extending slots adjacent its outboard end, a pin extending through said slots and through said shaft, and a helical spring mounted on said sleeve and having one end engaging the pin and its opposite end engaging the member at the inboard end of said sleeve.

6. In the combination recited in claim 5, a sealing ring mounted within the flange at the inboard end of the sleeve and interposed between the same and the outboard end of the bushing.

7. The combination, with a rotatable shaft and a sleeve member within which the shaft is adapted to rotate, of a packing structure comprising a sealing member surrounding said shaft and secured thereto against movement longitudinally thereof, a second sealing member surrounding the said shaft and movable longitudinally thereof, a third sealing member surrounding the shaft and formed on the end of the said sleeve member which is adjacent to the second sealing member, means for maintaining said sealing members in engagement with one another, the said means comprising a helical spring surrounding the shaft and rotatable therewith, a second sleeve member surrounding said shaft and on which the spring is mounted, the second sleeve member having at one end means adapted to engage the end of the first sleeve member opposite the end thereof which is engaged by the second sealing member, projections extending from said shaft, there being slots for said projections in the part of the second sleeve member remote from such engaging means, the spring pressing at one end against such engaging means and at its opposite end against said projections.

FREDERICK W. PETERS.